United States Patent [19]

Wang

[11] Patent Number: 4,620,842
[45] Date of Patent: Nov. 4, 1986

[54] SELF-ASSEMBLE REVOLVING GLOBE

[76] Inventor: Su Hui Wang, 428, Nanking W. Road, Taipei, Taiwan

[21] Appl. No.: 723,868

[22] Filed: Apr. 16, 1985

[51] Int. Cl.⁴ .............................................. G09B 27/08
[52] U.S. Cl. ..................................... 434/135; 428/33; 434/403; 434/137; 446/488
[58] Field of Search ............... 434/131, 135, 137, 148, 434/211, 403; 446/488; 428/33

[56] References Cited

U.S. PATENT DOCUMENTS 1,880,130  9/1932  Goldbach ....................... 434/403 X
2,153,053  4/1939  Smith ................................. 434/135
2,436,860  3/1948  Fisher ................................ 434/135

FOREIGN PATENT DOCUMENTS 1088671  9/1954  France ............................... 434/135

OTHER PUBLICATIONS

"Flat Map . . ." *Popular Mechanics* Jul. 1944, p. 88.

Primary Examiner—William H. Grieb
Attorney, Agent, or Firm—Holman & Stern

[57] ABSTRACT

Self-Assemble revolving globe using paper board materials in the making.

3 Claims, 4 Drawing Figures

SELF-ASSEMBLE REVOLVING GLOBE

BACKGROUND OF THE INVENTION

It is a common knowledge to parties engaged in the profession relating to paper-made terrestrial globe that the conventional method of making a terrestrial globe comprises essentially the preparation of a globe typically made of a plastic shell casing, the surface of the globe to be coated with a map of the world printed through halftone processing, the map being typically divided into 18 equal pieces for sticking adhesion, such a method has been known to call for high production costs, much labor and time, yet the precision level leaves much to be desired all the same.

To solve the disadvantages involved in the making of a terrestrial globe based on conventional methods, such as those mentioned in the foregoing, the inventor started to work for improvements therefor years ago and finally worked out the present invention. In substance the present invention makes possible the punch-pressing of paper boards having been printed to give a map of world through surface plating skills, to yield pentagonal and hexagonal folding and breaking vestiges with which to fold into a multilateral assembly, with tongue inserts provided on the rim of the break-away vestiges for engagement with correspondingly provided ports so that they will altogether form a multilaterally shaped terrestrial globe.

The same piece-by-piece assembling technique applies to the assemblage of the pedestal of an improved terrestrial globe structured hereunder, it has to be pointed out in particular that the map is prepared by means of a throughput surface plating printing procedure so that the precision of the terrestrial globe to be assembled to formation can be all the more promoted.

Other advantages of the present invention include easy assemblage such that even pupils of elementary schools can work with their hands to assemble fragments of the invention to formation, and this, it goes without saying, will help a lot to better enlighten the pupils of global geography, teachers of geography or fine arts courses will surely find the present invention of much value in the class. As the map that is made of paper boards assembled to formation is printed through surface plating procedure and subsequently subject to plastic processing, so it can yield a smooth surface free of contamination, such that it permits marking with a crayon, soft crayon, drawing pen, or ink-loaded sign pen thereon, because markings made with such marking instrument on the surface can be erased all at once with ease when no longer required.

SUMMARY OF THE INVENTION

Improved structure of paper-made terrestrial globe, comprising a world map made of paper boards disintegrated to a number of fragments each having a multilateral folding or break-away vestige provided through punch-pressing treatments, complementing each adjoining fragment with tongue inserts and complementary engagement ports, so that all the fragments can be assembled together to form a terrestrial globe, to be seated on a pedestal by passing an iron rod through the diameter interconnecting the north pole and south pole thereof to the pedestal which is also formed through fold-up assembling skills.

DESCRIPTION OF THE PREFERRED EMBODIMENT

The terrestrial globe (1) according to one embodiment of the present invention incorporates a world map made of paper board (10) through surface plating technique, the surface gone through a special plastic processing to permit marking made with a crayon, a soft crayon, or otherwise inkloaded sign pen thereon, such markings can be erased easily with a suitable tissue so that the map may retain its clear, clean image thereafter, as if no marking has been made previously at all.

Figure 3:
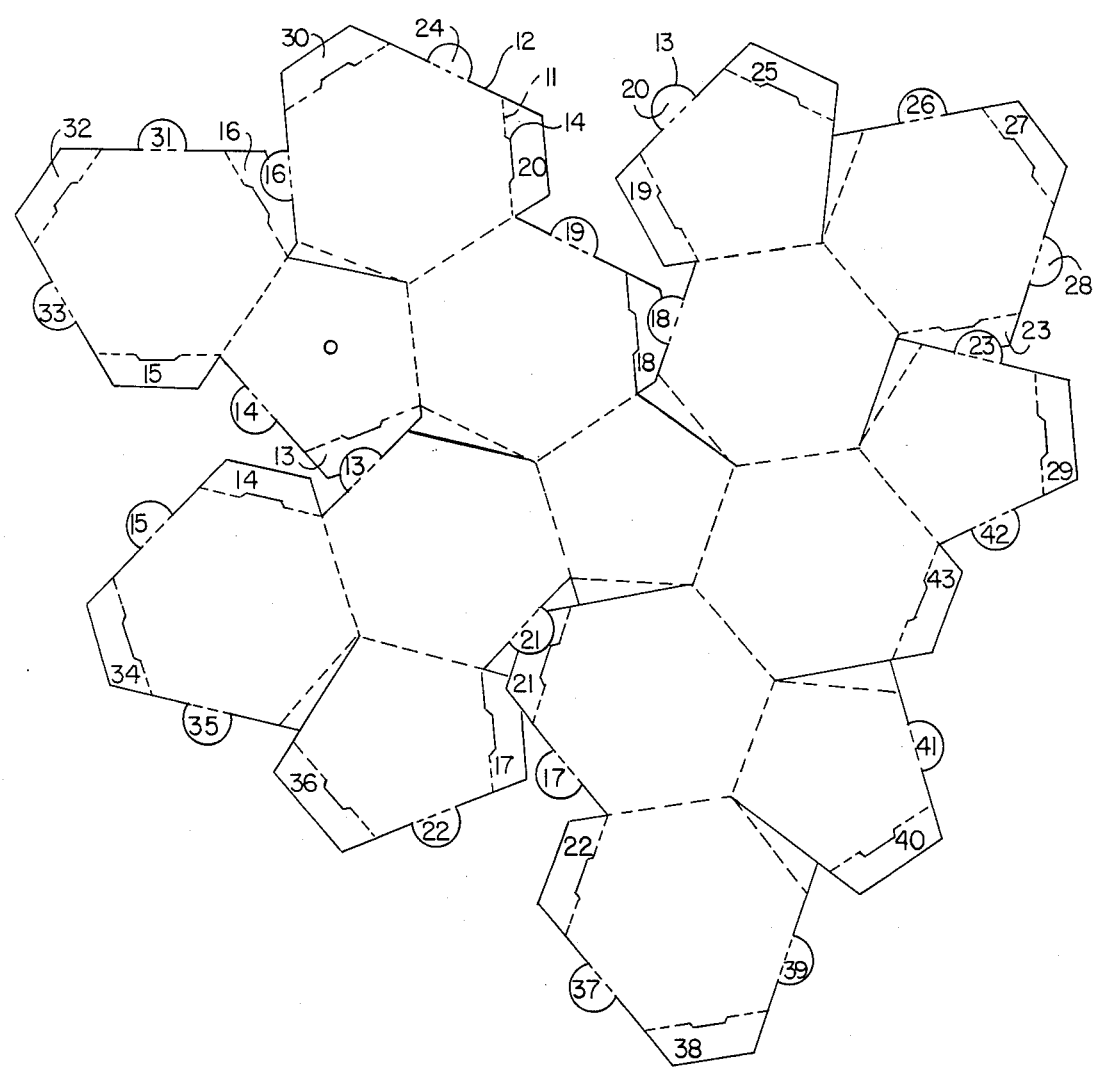
FIG. 3a is a layout of a first paper board printed to give a map of a part of the world, complete with folding and break-away vestiges provided through punch-pressing technique.
FIG. 3B is a layout of a second paperboard printed to give a map of the remainder of the world complimentary to the first board, and which interfits with the first board to form the globe shown in FIG. 1.
Figure 3:
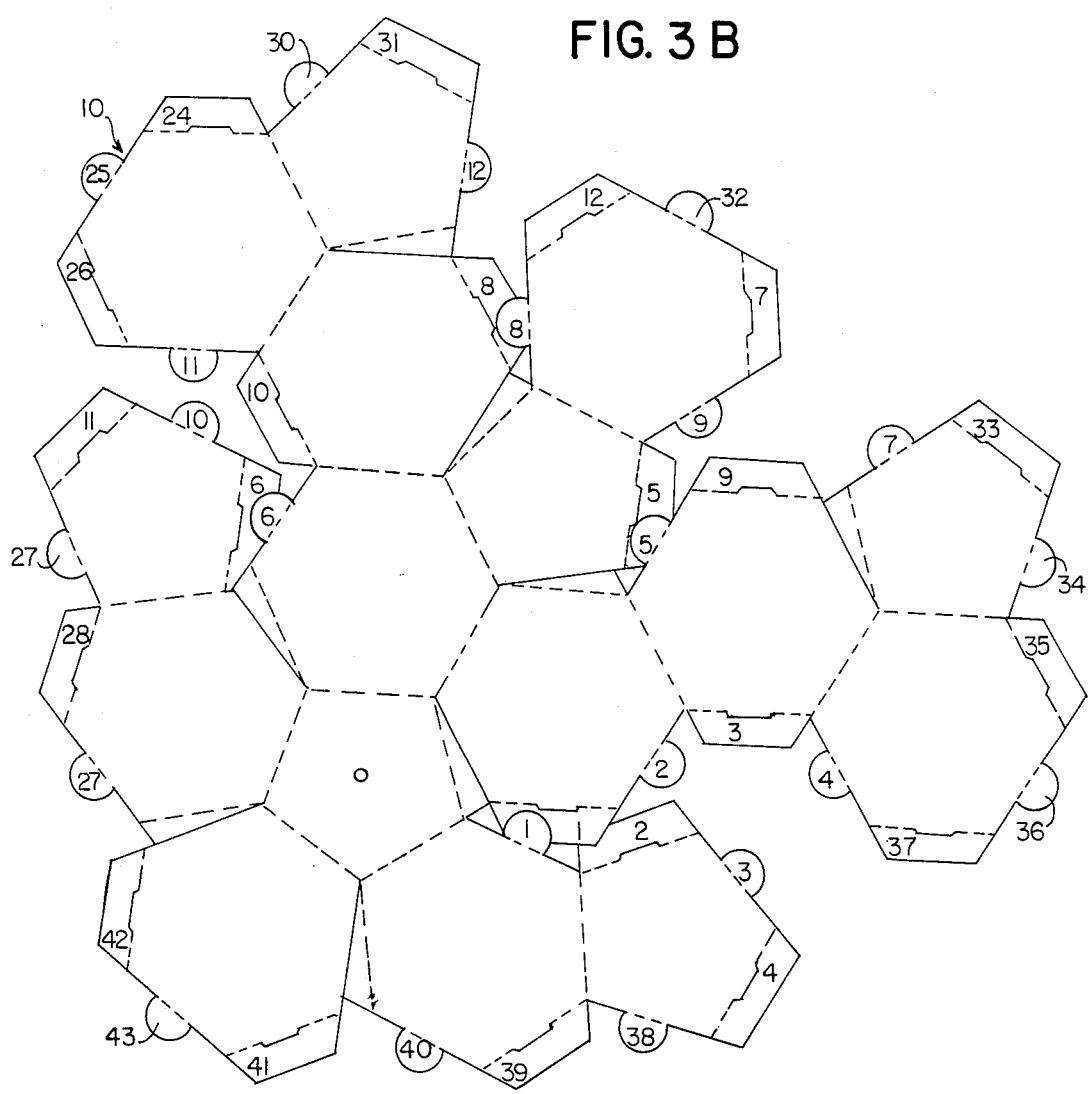

In execution the afore-mentioned surface plating printed world map (10) that is made of paper board can be composed of two sheets shown in FIGS. 3A and 3B respectively, duly punch-pressed to give a suitable number of polygonal folding vestiges (11) and break-away vestiges (12), such vestige aggregates can be triangular, quadrangular, pentagonal, hexagonal, etc., in the present embodiment the aggregate is pentagonal or hexagonal per unit.

On each of the polygonal break-away vestige (12) is attached integrally a tongue insert (13), on each of the folding vestige (11), an engagement port or slit (14) by symmetry, such that each of the polygonal unit may be folded up by inserting each tongue insert (13) into the adjoining engagement port (14), thus making up a terrestrial globe (1) in the long run.

It will be evident from FIGS. 3A and 3B that the ports (14) are formed on folding tabs extending from edges of respective polygonal segments and that the ports (14) are situated beyond the edges of the segments from which the tabs extend.

It is also to be noted that in each of the two world maps made of paper boards lying flat for assemblage, each tongue insert (13) is given a code to match the corresponding port (14) that is also given an identical code so as to facilitate fold-up assembling works orientated to the formation of a terrestrial globe, that is, a model of the globe.

It is believed by the inventor that such an assembling procedure was never heard of before in the industry, it is further believed that assembling of a number of fragments of paper boards piece by piece with respect to tongue inserts and adjoining port accounts easily for a breakthrough in the art of the production of terrestrial globes.

A preferred execution of the invention calls for the presentation of 32 units of pentagonal or hexagonal fragments integrated together to form a globe by engagement of each tongue insert (13) with adjoining port (14), the insert (13) being larger than a semi-circle of a suitable size attached to the outstanding edge of each outstanding fragment, but of a diameter corresponding to the width of the port (14) to ensure optimum coupling such that they will hold each other and come duly tensioned free of slackening effects, thanks in part to the tough elasticity incorporated into the paper board, in other words, a beautiful and correctly shaped globe can be produced without paste adhesion, so that the globe assembled to formation can be disassembled flat to facilitate carrying if needed, such an assemblage-disassembling procedure can be repeated all over again without subjecting the paper board, that is, the map surface, to fissure or breakage because of the CPP plastic lining incorporated in the material.

Figure 1:
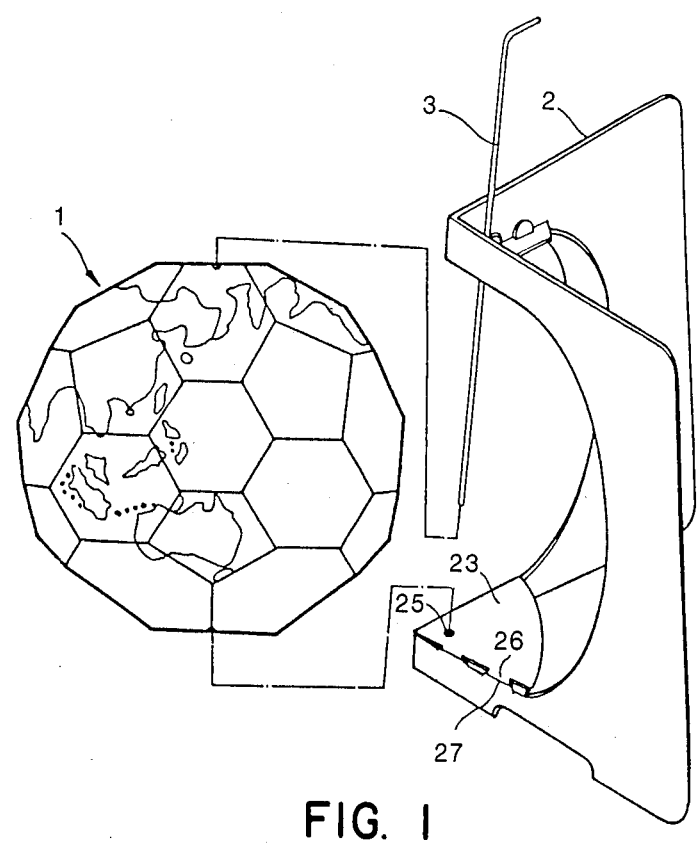
FIG. 1 is a general perspective of a terrestrial globe and the pedestal assembled to formation according to the invention.
Figure 2:
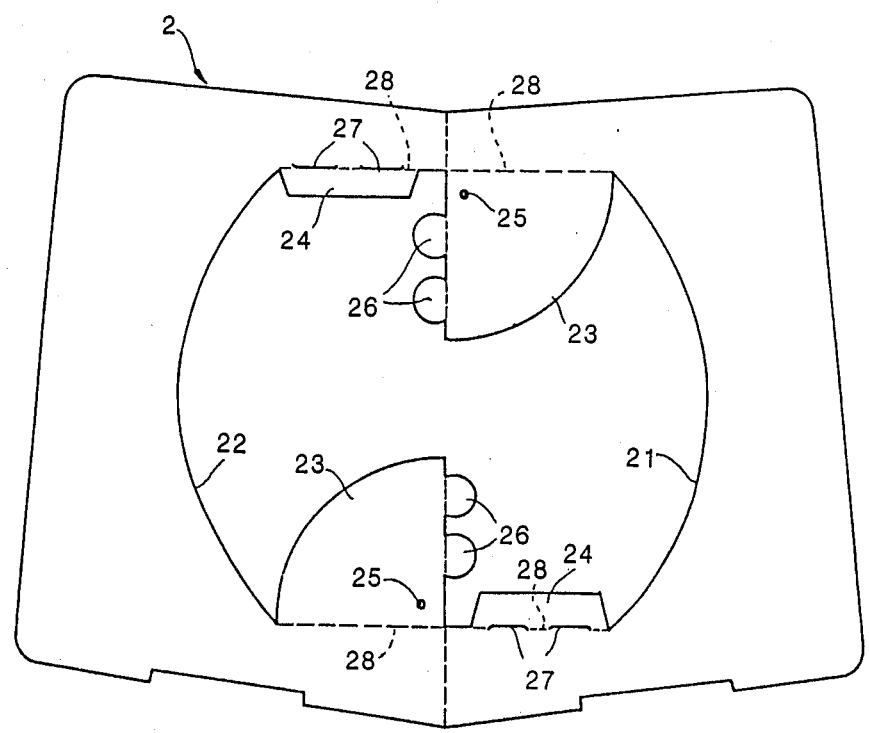
FIG. 2 is a perspective of the pedestal laying out flat in preparation for assembling to formation hereunder.

Referring to FIG. 2 it will be seen that the pedestal (2) to support the terrestrial globe structured hereunder is also to be constituted by the tongue insert/seaming gap integration technique disclosed hereinbefore for the globe, using a thicker card board, hollow-set, with both sides (21), (22) treated arcuated, with spaces for sector-seat (23) and protrusion (24) reserved on the top and on the bottom end respectively, the sector-seat (23) provided with a pin-hole (25) correlating to two tongue inserts (26) provided obliquely close by, whereas the protrusion (24) is provided with two matching hold-in slits (27), in order that the tongue inserts (26) may secure a tight hold by the slits (27) to form the pedestal (2) once the longitudinal fold-line (28) is folded by 90 degrees manually.

To finish, the globe (1) prepared previously is set into the hollow-set core of the pedestal (2) upon erection, an iron rod (3) let passing through the pin-hole (25) of the pedestal across the center point of the globe, there you have a terrestrial globe on the table.

I claim:

1. Apparatus for assembly into a terrestrial globe comprising at least one blank of sheet material printed with a map, the blank comprising polygonal segments interconnected by fold lines defining adjoining edges of adjacent segments, wherein the blank includes peripheral segments with unconnected edges, engagement tongues extending from certain of the unconnected edges, foldable tabs extending from others of the unconnected edges, and slits in the tabs beyond the respective edges of the segments from which the tabs extend for receiving respective ones of the engagement tongues when the blank is folded to form at least a part of the globe.

2. Apparatus as claimed in claim 1 wherein each tongue is shaped as a part of a circle with a circumferential arc extending over an angle greater than 180 degrees, and a diameter corresponding to the width of the respective slits.

3. Apparatus as claimed in claim 1 including a further foldable blank with tongue and groove connector means for forming into a pedestal with upper and lower bearing portions, and a pin for extending through the globe for receipt of opposite ends thereof in the respective bearing portions whereby the globe is mounted on the pedestal.

* * * * *